July 29, 1969     HANS-PETER HUBER     3,457,845
FLASH UNIT
Filed July 19, 1966
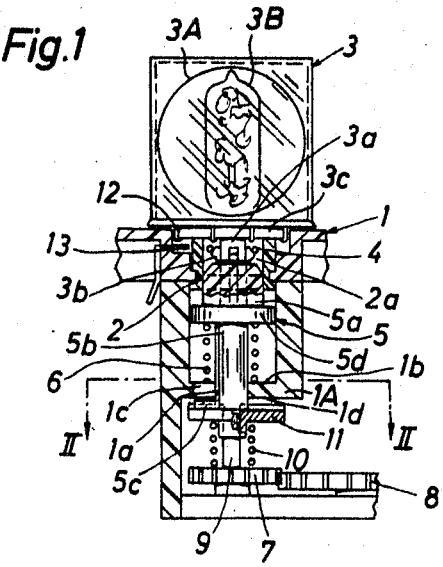
INVENTOR.
HANS-PETER HUBER
BY Michael S. Striker United States Patent Office 3,457,845
Patented July 29, 1969

3,457,845
FLASH UNIT
Hans-Peter Huber, Munich, Germany, assignor to Agfa-Gevaert Aktiengesellschaft, Leverkusen, Germany
Filed July 19, 1966, Ser. No. 566,440
Claims priority, application Germany, Aug. 6, 1965,
A 49,934
Int. Cl. G03b 15/03
U.S. Cl. 95—11    21 Claims

ABSTRACT OF THE DISCLOSURE

A photographic camera wherein a socket accommodates an indexible flash bulb container and is rotatable with an ejector which automatically expels the container from the socket in a predetermined angular position. The socket is held against rotation in one direction by a blocking device and is rotated in the other direction in response to manipulation of the film transporting mechanism. The blocking device consists of a first element which is mounted on the camera housing and a second element which is mounted on the socket and cooperates with the first element. The socket may be provided with an elastic diaphragm for preventing complete separation of the container from the socket by the ejector.

---

The present invention relates to flash units, especially for utilization in connection with or for incorporation in photographic cameras. More particularly, the invention relates to flash units of the type which can utilize multiple flash bulb containers, especially those known under the name "Flashcube" and usually having four rectangularly arranged equidistant reflectors each located behind a flash bulb which can be moved to a predetermined angular position and is then connected in the flash circuit of the camera. Still more particularly, the invention relates to improvements in flash units which are combined with ejectors capable of expelling a spent multiple flash bulb container when the last of its flash bulbs is expended, i.e., when the spent container must be replaced with a fresh container.

A serious drawback of conventional flash units wherein a spent multiple flash bulb container can be expelled by means of an ejector is that the user of the camera in or in connection with which the flash unit is being put to use must count the number of exposures with flash so that he knows when to operate the ejector. Alternatively, the user must examine the multiple flash bulb container in order to determine, by observing changes in the color of spent flash bulbs, whether or not there remain any unused flash bulbs in the container. Such visual inspection of multiple flash bulb containers is very difficult in nearly all situations when the exposures are made with flash because such exposures are normally made only when the prevailing lighting conditions are unsatisfactory for taking of pictures without artificial illumination of the subject, i.e., in partial or complete darkness.

Accordingly, it is an important object of the present invention to provide a flash unit for use with "Flashcubes" or analogous multiple flash bulb containers wherein a spent container can be expelled from its holder in automatic response to rotation of the container subsequent to utilization of the last unexpended flash bulb.

Another object of the invention is to provide a novel ejector which may be utilized in connection with a flash unit of the just outlined characteristics.

A further object of the invention is to provide a flash unit which can be coupled to the film transporting mechanism of a camera so that each of a series of fresh flash bulbs in its multiple flash bulb container can be automatically placed into an optimum position for emission of artificial light against the subject is response to successive operations of the film transporting mechanism.

An additional object of the instant invention is to provide a novel indexing mechanism which can be utilized in the improved flash unit to rotate the multiple flash bulb container through angles of desired magnitude so as to place successive flash bulbs in proper position with reference to the subject.

A concomitant object of the invention is to provide a flash unit wherein an expended flash bulb cannot be returned to such proper position with reference to the subject so that, as long as the container of the flash unit is not detached, the user of the camera knows that at least one fresh or unused flash bulb is available to furnish artificial light.

Another object of the invention is to provide a flash unit which occupies very little room, which can be coupled to the film transporting mechanism of a still camera or movie camera in a very simple and inexpensive way, and which can automatically place the ejector into operative position in response to proper insertion of a fresh multiple flash bulb container.

With the above and certain other objects in view, one feature of my present invention resides in the provision of a structure which is preferably embodied in a photographic camera and comprises a support, for example, the housing of a still camera, a first connector which preferably resembles a socket having an axially extending through passage of other than circular outline and is rotatably carried by the support but is held against axial movement, a multiple flash bulb container having a second connector preferably resembling a foot or plug which is separably coupled to the socket for rotation therewith in that it extends into a first end portion of the aforementioned passage, and an ejector which is coupled for rotation with the socket, for example, by having one of its end portions extend into a second end portion of the passage. The ejector is reciprocable with reference to the socket and plug toward a first end position in which its one end portion effects at least partial separation of the plug from the socket, for example, by moving into direct face-to-face abutment with the plug in the passage of the socket, and toward a second end position in which the user of the camera can readily insert the plug of a fresh multiple flash bulb container into the passage of the socket. The improved structure further comprises arresting means, preferably constituted by a wall or an analogous portion of the support, for holding the ejector against movement from the second end position toward the first end position in all but a predetermined angular position of the ejector, and a relatively strong helical spring or analogous biasing means for permanently urging the ejector to the first end position so that, in response to placing of the ejector to such predetermined angular position (after the ejector has been moved to its second end position), the one end portion of the ejector automatically effects at least partial separation of the multiple flash bulb container by expelling its plug from the passage of the socket or by shifting the plug sufficiently to allow for effortless manual separation of the container. The ejector can be moved to its second end position by hand in automatic response to insertion of the plug on a fresh multiple flash bulb container into the passage of the socket whereby the plug pushes the one end portion of the ejector against the opposition of the biasing means. A relatively small angular displacement of the ejector then suffices to move it from the aforementioned predetermined angular position so that the ejector is held by the arresting means and returns to its first end position upon completed rotation through a full revolution which suffices to connect each flash bulb of the container seriatim into the flash circuit. Thus, when the ejector returns into its predetermined angular position, all of the flash bulbs are expended and the spent container can be partially or completely separated from the socket.

Angular movements of the ejector (and hence of the socket and multiple flash bulb container) are preferably effected by resorting to a novel indexing mechanism which can be manipulated by hand or which can receive motion from the film transporting mechanism of the camera.

The novel features which are considered as characteristic of the invention are set forth in particular in the appended claims. The improved flash unit itself, however, both as to its construction and its mode of operation, together with additional features and advantages thereof, will be best understood upon perusal of the following detailed description of certain specific embodiments with reference to the accompanying drawings, in which:

FIG. 1 is a fragmentary vertical section through a photographic camera having a flash unit which embodies one form of the present invention;

FIG. 2 is an enlarged fragmentary horizontal section as seen in the direction of arrows from the line II—II of FIG. 1;

FIG. 3 is a fragmentary horizontal section through a modified flash unit;

FIG. 4 is a fragmentary top plan view of a photographic camera having a third flash unit; and FIG. 5 illustrates the ejector and certain other details of a third flash unit.

Referring first to FIG. 1, there is shown a main support 1 which is preferably constituted by the top wall of the housing of a photographic camera. The top face of the support 1 is formed with a depression which accommodates a female connector or socket 2 which is installed in such a way that it can rotate about its own axis but cannot move axially with reference to the support 1. The socket 2 is formed with a centrally extending through hole or passage 2a of other than circular outline, for example, the outline of the passage 2a may be of cruciform shape. The upper end portion of the passage 2a accommodates a mole connector or plug 3a forming part of a multiple flash bulb container 3 which is shown in the form of a so-called "Flashcube" having four vertical sides each located in front of a small flash bulb 3B. Each such flash bulb 3B is located in front of a reflector 3A. The plug 3a extends downwardly from a base 3c which carries four pairs of contacts 12, one pair for each flash bulb 3B. When the plug 3a is properly and fully inserted into the passage 2a, successive pairs of contacts 12 can be brought into current-conducting engagement with complementary pairs of contacts 13 provided in or on the support 1 whereby the flash circuit of any given flash bulb 3B is completed when the associated contacts 12 engage the fixed contacts 13. The plug 3a is further provided with tooth-like projections 3b which are held against uncontrolled extraction of the plug 3a by a hairpin-shaped retaining spring 4 mounted in the passage 2a.

The lower end portion of the passage 2a accommodates the cruciform upper end portion or extension 5a of a piston-like ejector 5. The cylindrical lower end portion or extension 5b of the ejector resembles a piston rod and is reciprocably and rotatably guided in a circular aperture 1a provided in a horizontal arresting wall 1A of the support 1. The upper surface 1b of the arresting wall 1A serves as an abutment or stop for a biasing device constituted by a relatively strong helical expansion spring 6 which bears against the collar 5d of the ejector 5 and tends to move the ejector to an upper end position, i.e., to move the cruciform extension 5a deeper into the passage 2a of the socket 2.

The lower end portion of the extension 5b carries a radially extending coupling element in the form of a projection or claw 5c which is receivable in a recess or slot 1c of the arresting wall 1A when the collar 5d abuts against the underside of the socket 2, i.e., when the spring 6 is allowed to expand. The spring 6 can expand only when the claw 5c registers with the radial slot 1c, i.e., only in a single predetermined angular position of the ejector. In the angular position shown in FIG. 1, the ejector 5 is held in its lower end position so that the spring 6 stores energy and the claw 5c is located at a level below the lower surface 1d of the arresting wall 1A. The plane of this surface 1d makes right angles with the axis of the ejector 5. The arresting wall 1A and the claw 5c can be said to constitute a bayonet lock because, as soon as the claw is moved to a level below the surface 1d and is rotated about the axis of the ejector 5, it moves out of registry with the radial slot 1c and the ejector is automatically retained in such lower end positon until and unless the claw 5c is returned into the position of registry with the slot 1c.

In accordance with another feature of the present invention, the "Flashcube" 3 can be indexed by an indexing mechanism which can derive motion from the film transporting mechanism of the camera. The film transporting mechanism includes a gear 8 which rotates with the customary film transporting sprocket or sprockets (not shown) and turns a second gear 7 through exactly 90 degrees whenever the film in the camera is advanced by the length of a film frame. The indexing mechanism includes the gear 7 which is rotatable in the support 1 at a level below the arresting wall 1A and is coaxially secured to a vertical shaft 9 of rectangular or other non-circular outline. The shaft 9 carries a clutch element in the form of a disk 11 and this disk is movable axially but is compelled to share all angular movements of the shaft 9 and gear 7. The indexing mechanism further comprises a relatively weak helical expansion spring 10 which operates between the gear 7 and the underside of the clutch disk 11 and urges the latter against the lower surface 1d of the arresting wall 1A. The upper end face of the disk 11 is provided with four equidistant radially extending recesses 11a each of which can accommodate the claw 5c of the ejector 5. As shown in FIG. 2, the recesses 11a make with each other angles of 90 degrees and when the gear 8 is at a standstill, i.e., when the film has been transported by the length of a frame, the slot 1c of the arresting wall 1a is located exactly midway between two recesses 11a. Thus, when the operator inserts a plug 3a into the passage 2a of the socket 2 and thereupon rotates the container 3 by hand through an angle of 45 degrees, the claw 5c slides along the surface 1d and then enters one of the recesses 11a because the spring 10 expands and moves the clutch disk 11 upwardly so that the latter again abuts against the surface 1d. The disk 11 is moved downwardly and away from the surface 1d when the claw 5c moves downwardly and beyond the slot 1c, provided that the slot 1c does not register with one of the recesses 11a. It will be noted that the number of recesses 11a equals the number of flash bulbs 3B in the container 3. When the claw 5c assumes the broken-line position of FIG. 2 and enters one of the recesses 11a, the axis of one of the reflectors 3A is preferably parallel to the optical axis of the camera so that the respective flash bulb 3B is in an optimum position for illumination of the subject.

The socket 2 is preferably engaged by a suitable blocking device (not shown) which does not allow it to rotate in one direction. For example, the blocking device can comprise a spring (see FIG. 4) or a spring-biased pawl which cooperates with suitable ratchet teeth provided on the circumference of the socket 2. This insures that the operator cannot rotate the container 3 in a sense to return a spent flash bulb 3B into the position in which such flash bulb was held when it was connected in the flash circuit.

The operation of the improved flash unit is as follows:

When the container 3 (which is assumed to contain four unexpended flash bulbs 3B) is not connected with the socket 2, the ejector 5 assumes its upper end position and the claw 5c is accommodated in the radial slot 1c of the arresting wall 1A. The gear 8 of the film transporting mechanism maintains the gear 7 of the indexing mechanism in the angular position of FIG. 2 so that the slot 1c makes angles of 45 degrees with the nearest two recesses 11a of the clutch disk 11. The indexing mechanism is disconnected from the ejector 5 because the claw 5c is accommodated in the slot 1c, not in one of the recesses 11a.

The upper portion of the passage 2a in the socket 2 is empty despite the fact that the extension 5a is fully accommodated in the socket 2. In other words, the axial length of the extension 5a is less than the length of the passage 2a. The operator then inserts the plug 3a whereby the suitably inclined faces of the projections 3b expand the spring 4 until the container 3 comes into abutment with the top face of the support 1. The spring 4 snaps behind the projections 3b and holds the plug 3a in the socket 2 with a relatively small force which can be overcome by the spring 6. During such insertion of the plug 3a, its lower end face bears against the top face of the extension 5a and moves the ejector 5 downwardly toward the lower end position shown in FIG. 1. The spring 6 stores energy and the claw 5c moves to a level below the surface 1d of the arresting wall 1A. The operator then turns the container 3 by hand through 45 degrees, whereby the claw 5c first slides along the surface 1d and ultimately snaps into one of the adjoining recesses 11a. Of course, as the ejector 5 moves toward the lower end position of FIG. 1, the claw 5c pushes the clutch disk 11 downwardly so that the spring 10 is compressed and the disk 11 slides axially along the shaft 9. The spring 10 expands as soon as the claw 5c enters one of the recesses 11a and the disk 11 then again abuts against the surface 1d. The ejector 5 is now properly coupled to the indexing mechanism and the socket 2 can rotate the container 3 in response to manipulation of the film transporting mechanism. As stated before, the spring 6 is strong enough to effect at least partial expulsion of the plug 3a from the passage 2a against the opposition of the retaining spring 4, and such partial or complete ejection or expulsion of the plug 3a will take place as soon as the claw 5c returns into registry with the slot 1c provided, of course, that the operator does not apply finger pressure against the container 3 in a sense to retain the plug in the socket 2.

The aforementioned blocking device preferably allows the socket 2 to rotate in a clockwise direction but holds the socket, and hence the ejector 5, against rotation in a counterclockwise direction. The contacts 13 of the support 1 are automatically engaged by a pair of contacts 12 when the claw 5c enters one of the recesses 11a. The respective flash bulb 3B is then connected in the flash circuit and the user can make an exposure with flash in response to closing of the customary synchronizing switch (not shown) which can be actuated in response to depression of the trigger. Upon completion of the first exposure, the user operates the film transporting mechanism to place the next unexposed film frame into proper position with reference to the objective whereby the gear 8 of the film transporting mechanism rotates the gear 7 of the indexing mechanism and the latter automatically turns the ejector 5, socket 2 and container 3 through exactly 90 degrees so that the next-following unexpended flash bulb 3B is placed into requisite position for illumination of the subject during the next exposure. The same procedure takes place prior to the third and fourth exposure. When the film transporting mechanism is manipulated upon completion of the fourth exposure, the claw 5c returns into registry with the slot 1c of the arresting wall 1A whereby the spring 6 is free to expand and moves the ejector 5 upwardly so that the extension 5a pushes the plug 3a and overcomes the resistance of the retaining spring 4.

In order to prevent actual ejection of the plug 3a, i.e., complete separation of the container 3 from the socket 2, the latter may be provided with an apertured intercepting diaphragm 15 of rubber or like elastically deformable material. The diaphragm 15, shown in FIG. 3, is secured to the upper portion of the socket 2 and its aperture 16 is dimensioned in such a way that it allows for substantially unimpeded passage of the major portion of the plug 3a but not of the projections 3b. Thus, when the plug 3a is inserted into the socket 2, the operator must force the projections 3b first through the aperture 16 of the elastic diaphragm 15 and thereupon into proper engagement with the spring 4. When the ejector 5 is allowed to move upwardly because the spring 6 dissipates energy, the projections 3b are disengaged from the spring 4 but are caught by the diaphragm 15 to thus prevent complete separation of a spent container 3. The operator notes that the container is nearly fully detached from the camera and must exert a very small force to pull the teeth 3b through the aperture 16 of the diaphragm 15. If the intercepting diaphragm is omitted, the operator will hear the slight noise when the spring 4 snaps back upon disengagement from the teeth 3b and the operator then simply lifts the spent container off the support 1. However, it is equally possible to select the length of the end portion 5a and the bias of the spring 6 in such a way that a spent container is fully separated from the socket 2 when the ejector 5 is allowed to move to its upper end position.

An important advantage of such positioning of the slot 1c with reference to the disk 11, in idle position of the film transporting mechanism, that the slot 1c is located between two adjoining recesses 11a is that a spent container 3 is ejected or partially separated during actual operation of the film transporting mechanism. In other words, ejection of spent containers is incidental to normal manipulation of the camera in order to place a fresh film frame into registry with the objective.

The ejector is coupled to the indexing mechanism only when a multiple flash bulb container 3 is actually connected with the socket 2. Otherwise, the film transporting mechanism can be operated independently of the ejector and need not rotate the socket 2.

The aforementioned blocking device prevents premature ejection of a container. Thus, were the socket 2 rotatable in either direction, a freshly expended flash bulb 3B could be returned to the position in which it was held during ignition. Also, by accidentally rotating the socket in the wrong direction, the user could cause the ejector 5 to expel a container 3 which accommodates one or more unused flash bulbs 3B.

Of course, the improved flash unit and camera are susceptible of many additional modifications without departing from the spirit of my invention. For example, the indexing mechanism including the gear 7, shaft 9, spring 10 and clutch disk 11 may be omitted if the socket 2 can be reached by hand to transmit torque to the container 3. Thus, the socket can be made to resemble a wheel 102 (FIG. 4) a portion of which extends from the support 101 and can be engaged by fingers to rotate the socket and the container. The socket 102 is then preferably combined or provided with suitable detent means 17–19 for releasably holding it against rotation after each angular displacement through 90 degrees. The operator will sense the resistance of the detent means and will know that a fresh flash bulb 3B has been placed into an optimum position for illumination of the subject. The detent means can comprise for equidistant notches 17 in the socket 102, a ball 18 reciprocable in the support 101 radially of the socket, and a spring 19 which biases the ball. Also, the socket 2 or 102 may comprise a portion which constitutes a gear and meshes with a gear corresponding to the gear 8 and forming part of the film transporting mechanism. In other words, the socket is then directly coupled to the indexing mechanism for the container. In such constructions, the drive which transmits rotary torque to the socket preferably includes a friction clutch. A blocking spring or pawl 103 cooperates with the teeth of the socket 102 to hold it against rotation in a counterclockwise direction.

It is also within the purview of my invention to utilize arresting or holding means in the form of a pin 20 (see FIG. 5) which is fixedly secured to the support 201 and may extend radially of the ejector 205. The latter then comprises a collar 205*d* having a circumferential groove 21 and an axially extending slot 22 which receives the arresting pin 20 in a given angular position of the ejector 205 and allows the pin 20 to enter the circumferential groove 21. Such modification involves nothing more but relieving the wall 1A of its arresting or holding function. The lower extension 205*b* is then telescopically connected to and rotates with the gear 7. The other extension 205*a* is analogous to the extension 5*a*.

Without further analysis, the foregoing will so fully reveal the gist of the present invention that others can, by applying current knowledge, readily adapt it for various applications without omitting features which fairly constitute essential characteristics of the generic and specific aspects of my contribution to the art.

What is claimed and new and desired to be protected by Letters Patent is:

1. In a structure of the character described, particularly in a photographic camera, the combination of a support; a first connector rotatably carried by said support; a multiple flash bulb container having a second connector separably coupled to said first connector for rotation therewith; an ejector coupled for rotation with said first connector and comprising an end portion, said ejector being reciprocable with reference to said connectors between a first end position in which said end portion effects at least partial separation of said second connector from said first connector and a second end position in which said end portion allows for coupling of said second connector to said first connector; arresting means for holding said ejector against movement from said second end position to said first end position in all but a predetermined angular position of said ejector; biasing means for permanently urging said ejector toward said first end position so that, in response to placing of the ejector to such predetermined angular position, said end portion automatically effects at least partial separation of said second connector from said first connector; and blocking means for permanently holding said connectors against rotation in a first direction while allowing rotation of said connectors in the opposite direction, said blocking means comprising a first portion provided on said support and a second portion cooperating with said first portion and provided directly on said first connector.

2. A combination as set forth in claim 1, wherein the first portion of said blocking means comprises a spring.

3. A combination as set forth in claim 1, wherein said first connector comprises a manually engageable portion to facilitate rotation of said connectors and said ejector.

4. A combination as set forth in claim 1, further comprising intercepting means for intercepting said container in response to separation of said second connector from said first connector.

5. A combination as set forth in claim 1, wherein said first connector is constituted by a socket having a substantially axially extending passage of other than circular cross section and said second connector is constituted by a plug which extends into said passage from one axial end of said socket, said one end portion of the ejector extending into said passage from the other axial end of said socket so that, in said predetermined angular position thereof, the ejector can be moved from said first to said second end position in response to introduction of the plug into said socket.

6. A combination as set forth in claim 5, wherein said passage is of substantially cruciform cross-sectional outline and said end portion of the ejector is slidably but non-rotatably fitted into the respective end of said passage.

7. A combination as set forth in claim 5, wherein the length of said passage exceeds the length of the end portion of said ejector.

8. A combination as set forth in claim 5, wherein said container comprises a plurality of flash bulbs evenly distributed about the axis of said socket and further comprising a first pair of electric contact means provided on said support and a second pair of electric contact means provided on said container for each of said flash bulbs, one of said second pairs of contact means engaging said first pair of contact means in response to angular displacement of said ejector through a predetermined angle from said predetermined angular position.

9. A combination as set forth in claim 8, wherein said predetermined angle is 45 degrees.

10. A combination as set forth in claim 1, wherein said arresting means comprises a wall on said support, said wall having a surface facing away from said connectors and a recess provided in said surface, said ejector comprising a projection registering with said recess in said predetermined angular position of the ejector so that the ejector can follow the action of said biasing means to move to said first end position.

11. A combination as set forth in claim 10, wherein said surface is located in a plane making right angles with the axis of said ejector, said projection abutting against said surface under the action of said biasing means when the ejector is moved to said second end position so that the projection leaves said recess when the ejector is thereupon rotated from said predetermined angular position.

12. A combination as set forth in claim 1, wherein said support is constituted by the housing of a photographic camera comprising film transporting means operative to move the film stepwise, and further comprising indexing means coupled to said film transporting means and arranged to rotate said first connector in response to stepwise movement of the film, said container comprising a plurality of angularly distributed flash bulbs which are placed seriatim to an optimum position for lilumination of a subject in response to successive operations of said film transporting means.

13. A combination as set forth in claim 12, wherein said indexing means is arranged to rotate said first connector through the intermediary of said ejector.

14. A combination as set forth in claim 13, wherein said indexing means comprises a rotary clutch element coaxial with said ejector and having at least one radially extending recess, said ejector comprising a radially extending claw which is received in said one recess when the ejector is moved to said second end position and is thereupon rotated from said predetermined angular position whereby the clutch element can transmit torque to said first and second connectors by rotating said ejector until the ejector returns to said predetermined angular position.

15. A combination as set forth in claim 14, wherein said container comprises four equidistant flash bulbs and said clutch element has four equidistant radial recesses.

16. In a structure of the character described, particularly in a photographic camera, the combination of a support; a first connector rotatably carried by said support; a multiple flash bulb container having a second connector separably coupled to said first connector for rotation therewith; an ejector coupled for rotation with said first connector and comprising an end portion, said ejector being reciprocable with reference to said connectors toward a first end position in which said end portion effects at least partial separation of said second connector from said first connector and toward a second end position in which said end portion allows for coupling of said second connector to said first connector; arresting means for holding said ejector against movement from said second end position to said first end position in all but a predetermined angular position of said ejector, said arresting means comprising a wall integral with said support and having a surface facing away from said connectors, a recess provided in said surface and an aperture communicating with said recess; and biasing means for permanently urging said ejector toward said first end position so that, in response to placing of the ejector to said predetermined angular position, said end portion automatically effects at least partial separation of said second connector from said first connector, said ejector further comprising a projection registering with said recess in said predetermined angular position of the ejector so that the ejector can follow the action of said biasing means to move to said first end position, and a second end portion which is reciprocable and rotatable in said aperture and is rigid with said projection.

17. A combination as set forth in claim 16 wherein said biasing means comprises a helical expansion spring and wherein said ejector comprises a collar between said end portions thereof, said spring surrounding said second end portion and operating between said wall and said collar.

18. In a structure of the character described, particularly in a photographic camera, the combination of a support constituting the housing of the camera; film transporting means operative to move the film stepwise; a first connector rotatably carried by said support; indexing means coupled to said film transporting means and arranged to rotate said first connector in response to stepwise movement of the film; a multiple flash bulb container having a second connector separably coupled to said first connector for rotation therewith, said container comprising four equidistant angularly distributed flash bulbs which are placed seriatim to an optimum position for illumination of a subject in response to successive operations of said film transporting means; an ejector coupled for rotation with said first connector and comprising an end portion, said ejector being reciprocable with reference to said connectors toward a first end position in which said end portion effects at least partial separation of said second connector from said first connector and toward a second end position in which said end portion allows for coupling of said second connector to said first connector, said indexing means being arranged to rotate said first connector through the intermediary of said ejector and comprising a rotary disk-shaped clutch element coaxial with said ejector and having four equidistant radial recesses; arresting means for holding said ejector against movement from said second end position to said first end position in all but a predetermined angular position of said ejector, said ejector further comprising a radially extending claw which is received in one of said recesses when the ejector is moved to said second end position and is thereupon rotated from said predetermined angular position whereby the clutch element can transmit torque to said first and second connectors by rotating said ejector until the ejector returns to said predetermined angular position, a shaft rotatably mounted in said support and axially movably supporting said disk-shaped clutch element so that the latter is compelled to share all angular movements of said shaft; biasing means for urging said clutch element axially of said shaft and toward said claw, and means for rotating said shaft through identical angles in response to successive operations of said film transporting means; and second biasing means for permanently urging said ejector toward said first end position so that, in response to placing of the ejector to said predetermined angular position, said end portion automatically effects at least partial separation of said second connector from said first connector.

19. A combination as set forth in claim 18, wherein the means for rotating said shaft comprises a first gear and said film transporting means comprises a second gear meshing with said first gear.

20. In a structure of the character described, particularly in a photographic camera, the combination of a support; a first connector rotatably carried by said support; a multiple flash bulb container having a second connector separably coupled to said first connector for rotation therewith, said second connector comprising a plug and at least one projection extending radially of said plug; an ejector coupled for rotation with said first connector and comprising an end portion, said ejector being reciprocable with reference to said connectors toward a first end position in which said end portion effects at least partial separation of said second connector from said first connector and toward a second end position in which said end portion allows for coupling of said second connector to said first connector; arresting means for holding said ejector against movement from said second end position to said first end position in all but a predetermined angular position of said ejector; biasing means for permanently urging said ejector toward said first end position so that, in response to placing of the ejector to said predetermined angular position, said end portion automatically effects at least partial separation of said second connector from said first connector; and intercepting means for intercepting said container in response to separation of said second connector from said first connector, said intercepting means comprising an elastic diaphragm adjacent to said first connector and having an aperture large enough to permit insertion and withdrawal of said plug but opposing the introduction and withdrawal of said projection.

21. In a structure of the character described, particularly in a photographic camera, the combination of a support; a first connector rotatably carried by said support; a multiple flash bulb container having a second connector separably coupled to said first connector for rotation therewith; an ejector coupled for rotation with said first connector and comprising an end portion, said ejector being reciprocable with reference to said connectors toward a first end position in which said end portion effects at least partial separation of said second connector from said first connector and toward a second end position in which said end portion allows for coupling of said second connector to said first connector; arresting means for holding said ejector against movement from said second end position to said first end position in all but a predetermined angular position of said ejector, said arresting means comprising a pin provided on said support and said ejector having a circumferential groove and an axially parallel slot communicating with said groove and registering with said pin when the ejector is moved to said predetermined angular position so that, in response to movement of the ejector to said second end position, the pin slides in said slot and enters said circumferential groove to permit rotation of the ejector; and biasing means for permanently urging said ejector toward said first end position so that, in response to placing of the ejector to said predetermined angular position, said end portion automatically effects at least partial separation of said second connector from said first connector.

References Cited

UNITED STATES PATENTS

| | | | |
|---|---|---|---|
| 3,096,025 | 7/1963 | Prochnow | 240—1.3 |
| 3,111,274 | 11/1963 | Turano | 240—1.3 |
| 3,263,068 | 7/1966 | Jakob | 240—1.3 |
| 3,353,468 | 11/1967 | Beach | 95—11.5 |
| 3,357,329 | 12/1967 | Nerwin | 95—11 |
| 2,342,085 | 2/1944 | MacKay | 240—37.1 |

NORTON ANSHER, Primary Examiner

F. L. BRAUN, Assistant Examiner

U.S. Cl. X.R.

240—1.3, 37.1; 339—45